(12) United States Patent
Martens et al.

(10) Patent No.: US 8,858,720 B2
(45) Date of Patent: Oct. 14, 2014

(54) METHOD FOR CLEANING DEPOSITS FROM TURBOCHARGER AND SUPERCHARGER COMPRESSORS

(75) Inventors: Ard Martens, Valkenswaard (NL); Graham Nancekievill, Felixstowe (GB); Ludo Dejaeghere, Moorslede (BE)

(73) Assignee: Chevron Belgium NV (BE)

( * ) Notice: Subject to any disclaimer, the term of this patent is extended or adjusted under 35 U.S.C. 154(b) by 1333 days.

(21) Appl. No.: 12/331,239

(22) Filed: Dec. 9, 2008

(65) Prior Publication Data

US 2010/0139697 A1 Jun. 10, 2010

(51) Int. Cl.
| | | |
|---|---|---|
| B08B 9/00 | (2006.01) | |
| C11D 11/00 | (2006.01) | |
| C11D 7/50 | (2006.01) | |
| F02B 39/16 | (2006.01) | |
| C11D 7/32 | (2006.01) | |
| F04D 29/70 | (2006.01) | |
| F02B 77/04 | (2006.01) | |
| F01D 25/00 | (2006.01) | |
| C11D 7/24 | (2006.01) | |

(52) U.S. Cl.
CPC ............ *F02B 39/16* (2013.01); *C11D 11/0041* (2013.01); *C11D 7/5027* (2013.01); *C11D 7/3263* (2013.01); *F04D 29/701* (2013.01); *C11D 7/247* (2013.01); *F02B 77/04* (2013.01); *C11D 7/3281* (2013.01); *F01D 25/002* (2013.01)
USPC .......................... 134/22.1; 134/23; 134/22.19

(58) Field of Classification Search
USPC .................................................. 134/22.1, 23
See application file for complete search history.

(56) References Cited

U.S. PATENT DOCUMENTS

| | | | | |
|---|---|---|---|---|
| 4,039,300 | A * | 8/1977 | Chloupek et al. ............... | 44/347 |
| 4,548,040 | A | 10/1985 | Miller et al. | |
| 4,695,224 | A | 9/1987 | Lown | |
| 5,944,483 | A | 8/1999 | Beck et al. | |
| 6,475,251 | B1 | 11/2002 | Ahmadi | |
| 6,575,711 | B1 * | 6/2003 | Pugnet et al. .................. | 417/313 |
| 6,609,360 | B2 * | 8/2003 | Utamura .................... | 60/39.092 |
| 6,616,776 | B1 | 9/2003 | Ahmadi et al. | |

FOREIGN PATENT DOCUMENTS

| | | |
|---|---|---|
| DE | 102007047071 | 4/2009 |
| DE | 102007047071 A1 | 4/2009 |

(Continued)

OTHER PUBLICATIONS

European Search Report for Application No. EP 09177886 dated Feb. 12, 2010, The Hague.

*Primary Examiner* — Michael Kornakov
*Assistant Examiner* — Katelyn Whatley (57) ABSTRACT

A method for removing deposits from at least one compressor powered by an engine. The method comprises disconnecting while the engine is turned off, a high pressure downstream side of the compressor from an intercooler, or an air intake manifold for non-intercooled engines, while leaving the compressor attached to a means used in the engine to drive the compressor. The output airflow is diverted from the compressor away from the engine to a disposal or to a means of separating a cleaning fluid from air. After starting the engine and while the engine is running, the cleaning fluid is injected for a sufficient time to clean the compressor.

20 Claims, 3 Drawing Sheets

(56) References Cited

U.S. PATENT DOCUMENTS

| | | |
|---|---|---|
| 6,651,604 B2 | 11/2003 | Ahmadi et al. |
| 6,652,667 B2 | 11/2003 | Ahmadi et al. |
| 2002/0107161 A1 | 8/2002 | Gatzke |
| 2003/0158060 A1* | 8/2003 | Ahmadi et al. ............... 510/185 |
| 2006/0245913 A1 | 11/2006 | Thiele et al. |
| 2007/0169746 A1* | 7/2007 | Irisawa ........................ 123/431 |
| 2008/0128326 A1* | 6/2008 | McCoy et al. .................. 208/69 |

FOREIGN PATENT DOCUMENTS

| | | |
|---|---|---|
| FR | 2789127 | 8/2000 |
| FR | 2789127 A1 | 8/2000 |
| GB | 1252237 A | 11/1971 |
| WO | WO2005028876 | 3/2005 |

* cited by examiner

METHOD FOR CLEANING DEPOSITS FROM TURBOCHARGER AND SUPERCHARGER COMPRESSORS

FIELD OF THE INVENTION

The present invention relates to a method for removing turbocharger and supercharger compressor deposits without dismantling the compressor, and allowing for the cleaning of deposits on a running engine without the cleaning fluid being consumed by the engine.

BACKGROUND OF THE INVENTION

Turbochargers, and less, commonly, superchargers, are used to increase engine power output by providing higher charge-air density such that more fuel can be burned in each engine cycle, by scavenging airflow to clear the cylinders of combustion products, and by cooling engine parts allowing for power increases. The utilization of a turbocharger with an engine results in increased horsepower output and higher brake mean effective pressure because the higher air density improves engine performance at low loads and permits the engine to operate not only at an optimum efficiency point, but also at reduced speeds and loads. The use of a turbocharger may further act to restore sea level ratings on engines operating at high altitudes by compensating for reduced atmospheric pressures, and may make possible maximum speed acceleration to synchronous speed for fast reliable starts as well as reducing fuel and oil consumption.

Turbocharger and supercharger compressors are very finely machined and run at very high speeds, generally many thousands of revolutions per minute, and therefore are very sensitive to deposit deposition. These deposits are especially severe in engines equipped with exhaust gas recirculation (EGR) or where crankcase ventilation gases are fed into the intake system of the engine upstream of the compressor.

Previously, compressor deposits had to be removed by removing and dismantling the compressor and cleaning the parts away from the engine. One approach is to use chemical cleaning fluids to dissolve the deposits. One cannot simply spray cleaning fluid into the compressor with the engine turned off, however, as large amounts of cleaning fluid are required which will accumulate and cause puddles in the inlet system. The result of this is that these puddles will be ingested and the engine will "run away" when the engine is turned back on, possibly resulting in dangerous operating conditions and damage to the engine. For the same reason, one cannot imply spray cleaning fluid into the compressor while the output of the compressor is fed into the operating engine. One potential solution to prevent "run away" under these conditions is to install an air restriction valve in the air intake system. However, this would entail significant engineering modification and does hot prevent the engine from consuming the cleaning fluid as a non-ideal fuel.

Surprisingly, we have discovered a method for removing turbocharger and supercharger compressor deposits without dismantling the compressor that allows for the cleaning of deposits on a running engine, but without the cleaning fluid being consumed by the engine. Removal of these deposits are important because excessive deposits can cause a restriction of intake airflow, loss of compression, loss of power in the engine, and increased emissions, especially smoke.

SUMMARY OF THE INVENTION

One aspect of this invention is directed to a method for removing deposits from at least one compressor powered by an engine. The method comprises disconnecting, while the engine is turned off, a high pressure downstream side of the compressor from an intercooler, or an air intake manifold for non-intercooled engines, while leaving the compressor attached to a means used in the engine to drive the compressor. The output airflow is diverted from the compressor away from the engine to a disposal or to a means of separating a cleaning fluid from air. A means to inject the cleaning fluid into the air stream is introduced in the low pressure side upstream of said compressor. After starting the engine, and while the engine is running, the cleaning fluid is injected via the aforementioned means for a sufficient time to clean the compressor.

Another aspect of the invention is directed to a method for removing deposits from at least one compressor powered by an engine. The method comprises disconnecting, while the engine is turned off, a high pressure downstream side of the compressor from an intercooler, or an air intake manifold for non-intercooled engines, while leaving said compressor attached to a means used in the engine to drive the compressor. A conduit is attached to the high pressure downstream side of the compressor, and an input to and output from a means for separating a cleaning fluid from air is as also attached. The output airflow is diverted from the compressor to the means for separating the cleaning fluid from air, and further directing the remainder of the airflow to the engine air intake system. A means to inject the cleaning fluid into the air stream is introduced in the low pressure side upstream of the compressor. After starting the engine, and while the engine is running, the cleaning fluid is injected via the aforementioned means for a sufficient time to clean said compressor.

DETAILED DESCRIPTION OF THE INVENTION

This invention allows for a chemical cleaning method of turbocharger deposits on a running engine without having the cleaning fluid composition be consumed by the engine.

DEFINITIONS

The term "hydrocarbon" denotes compounds with purely or predominantly hydrocarbon character, and include the following:

(1) Purely hydrocarbon; that is, aliphatic, (e.g., alkyl or alkenyl), alicyclic (e.g., cycloalkyl or cycloalkenyl), aromatic, aliphatic and alicyclic-substituted aromatic, aromatic-substituted aliphatic and alicyclic compounds, and the like, as well as cyclic compounds wherein the ring is completed through another portion of the molecule (that is, any two indicated substituents may together form an alicyclic group). Non-limiting examples include octane, octadecane, cyclohexane, benzene, toluene, etc.

(2) Substituted hydrocarbon; that is, compounds containing non-hydrocarbon substituents which do not alter the predominantly hydrocarbon character of the compound. Those skilled in the art will be aware of suitable substituents. Non-limiting examples of substituents include hydroxy, nitro, cyano, alkoxy, acyl, etc.

(3) Heteroatom compounds; that is, compounds which while predominantly hydrocarbon in character, contain atoms other than carbon in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbyl group. Preferably, there are no substituents or hetero atoms in the compound.

An "aromatic" compound contains at least one aromatic ring, such as a phenyl or naphthyl ring. An aromatic compound may have substituents or the ring such as alkyl groups, or other substituents such as those named above.

The Cleaning Fluid

The cleaning fluid employed in this invention is preferably composed of a major amount of an aromatic hydrocarbon solvent. The aromatic hydrocarbon solvent of the present invention is present in a "major amount." A "major amount" of an aromatic hydrocarbon solvent refers to a concentration of the solvent within the cleaning solution of at least about 40 vol % aromatics. In some embodiments, "a major amount" of an aromatic solvent refers to a concentration of the solvent within the cleaning solution of at least about 50 vol % aromatics, at least about 60 vol % aromatics, at least about 70 vol % aromatics, at least about 80 vol % aromatics, or at least about 90 vol % aromatics. The volume % aromatics of a cleaning solution can be measured by any: convenient method, such as by ASTM D 1319, or by gas chromatography.

The Aromatic Hydrocarbon Solvent

For reasons of solubility of deposits, compatibility with engine parts and engine fuels, safety, and cost, aromatic hydrocarbon solvents are the preferred solvents for this invention. Suitable aromatic solvents include benzene, toluene, xylene or higher boiling aromatics or aromatic thinners, such as a $C_9$ aromatic solvent. A preferred solvent for use in the present invention, is a $C_9$ aromatic solvent. This includes mixtures of $C_9$ aromatics such as trimethyl benzene and ethyl toluene or propyl benzene which exhibit good solvency and compatibility with fuels. Other aromatic petroleum distillates may also be used, and preferably they are hot classified as volatile organic compounds. Preferred aromatic petroleum distillates are naphthalene depleted (i.e. contain less than about 1% by weight naphthalene) since naphthalene may be classified as a hazardous air pollutant. Suitable aromatic petroleum distillates are commercially available as ARO-MATIC 100, 150, 200 from ExxonMobil Chemical Company and Aromatic 150 type Caromax 20ND from Petrochem Carless.

The aromatic hydrocarbon solvent will preferably contain at least 70 vol % aromatics by ASTM D 1319; more preferably at least 80 vol % aromatics; more preferably at least 90 vol % aromatics; even more preferably at least about 95 vol % aromatics by ASTM D 1319. The solvent will preferably have an end boiling point by ASTM D 86 of less than 300° C.; more preferably less than 250° C.; more preferably less than 180° C. For safety reasons, it is preferred that the aromatic hydrocarbon solvent have a flash point of at least 15° C.; more preferably 35° C. Preferably, the viscosity of the aromatic hydrocarbon solvent is less than 4 cSt@25° C.

Other solvents, such as aliphatic hydrocarbon or oxygenated solvents, may be used in the invention, as long as the Concentration of such solvents is low enough not to change the overall aromatic nature of the cleaning solution. Suitable aliphatic solvents include dearomatized solvents, such as Exxsol D40 and D60, available from ExxonMobil, other aliphatic solvents, such as D15-20 Naphtha, D115-145 Naphtha and D31-35 Naphtha, also available from ExxonMobil, and nonaromatic mineral, spirits, and the like. Oxygenated solvents include mono and polyalcohols; glycol ethers such as ethylene glycol butyl ethers; polyoxyalkylene compounds such as phenoxy mono- or poly(oxyalkylene) alcohols; and other ethers and ketones.

The Nitrogen-Containing Detergent Additive

The cleaning composition, employed in the present invention may optionally also contain at least one nitrogen-containing detergent additive. Generally speaking, a detergent additive is a fuel-soluble polar compound added to gasoline and diesel fuels, especially automotive fuels, which is used to clean deposits or keep deposits from forming in at least one area of a fuel intake system. Areas of deposit formation in gasoline engines include fuel injectors, carburetors and intake valves. Areas of deposit formation in diesel engines include the fuel pumps and injectors, in particular the injector nozzles and pump plungers. Suitable detergent additives for use in this invention include, for example, aliphatic hydrocarbyl amines, hydrocarbyl-substituted poly(oxyalkylene) amines, hydrocarbyl-substituted succinimides, Mannich reaction products nitro and amino aromatic esters of polyalkylphenoxyalkanols, polyalkylphenoxyaminoalkanes, and mixtures thereof.

The aliphatic hydrocarbyl-substituted amines which may be employed in the present invention are typically straight or branched chain hydrocarbyl-substituted amines having at least one basic nitrogen atom and wherein the hydrocarbyl group has a number average molecular weight of about 700 to 3,000. Preferred aliphatic hydrocarbyl-substituted gamines include polyisobutenyl and polyisobutyl monoamines and polyamines.

The aliphatic hydrocarbyl amines employed in this invention are prepared by conventional procedures known in the art. Such aliphatic hydrocarbyl amines and their preparations are described in detail in U.S. Pat. Nos. 3,438,757; 3,565,804; 3,574,576; 3,848,056; 3,960,515; 4,832,702; and 6,203,584, the disclosures of which are incorporated, herein by reference in their entirety.

Another class of detergent additives suitable for use in the present invention are the hydrocarbyl-substituted poly(oxyalkylene) amines, also referred to as polyether amines. Typical hydrocarbyl-substituted poly(oxyalkylene) amines include hydrocarbyl poly(oxyalkylene) monoamines and polyamines wherein the hydrocarbyl group contains from 1 to about 30 carbon atoms, the number of oxyalkylene units will range from about 5 to 100, and the amine moiety is derived from ammonia, a primary alkyl or secondary dialkyl monoamine, or a polyamine having a terminal amino nitrogen atom. Preferably, the oxyalkylene moiety will be oxypropylene or oxybutylene or a mixture thereof. Such hydrocarbyl-substituted poly(oxyalkylene) amines are described, for example, in U.S. Pat. No. 6,217,624, and U.S. Pat. No. 5,112,364, the disclosures of which are incorporated herein by reference in their entirety.

A preferred type of hydrocarbyl-substituted poly(oxyalkylene) monoamine is an alkylphenyl poly(oxyalkylene)monoamine wherein the poly(oxyalkylene) moiety contains oxypropylene units or oxybutylene units or mixtures of oxypropylene and oxybutylene units. Preferably, the alkyl group on the alkylphenyl moiety is a straight or branched-chain alkyl of 1 to 24 carbon atoms. An especially preferred alkylphenyl moiety is tetrapropenylphenyl, that is, where the alkyl group is a branched-chain alkyl of 12 carbon atoms derived from propylene tetramer.

An additional type of hydrocarbyl-substituted poly(oxyalkylene)amine finding use in the present invention are hydrocarbyl-substituted poly(oxyalkylene) aminocarbamates disclosed for example, in U.S. Pat. Nos. 4,288,612; 4,236,020; 4,160,648, 4,191,537; 4,270,930; 4,233,168; 4,197,409; 4,243,798 and 4,881,945, the disclosure of each of which are incorporated herein by reference.

These hydrocarbyl poly(oxyalkylene)aminocarbamates contain at least one basic nitrogen atom and have an average molecular weight of about 500 to 10,000, preferably about 500 to 5,000, and more preferably about 1,000 to 3,000. A preferred aminocarbamate is alkylphenyl poly(oxybutylene) aminocarbamate wherein the amine moiety is derived from ethylene diamine or diethylene triamine.

A further class of detergent additives suitable for use in the present invention are the hydrocarbyl-substituted succinimides. Typical hydrocarbyl-substituted succinimides include polyalkyl and polyalkenyl succinimides wherein the polyalkyl or polyalkenyl group has an average molecular weight of about 500 to 5,000, and preferably about 700 to 3,000. The hydrocarbyl-substituted succinimides are typically prepared by reacting a hydrocarbyl-substituted succinic anhydride with an amine or polyamine having at least one reactive hydrogen bonded to an amine nitrogen atom. Preferred hydrocarbyl-substituted succinimides include polyisobutenyl and polyisobutanyl succinimides, and derivatives thereof.

The hydrocarbyl-substituted succinimides finding, use in the present invention are described, for example, in U.S. Pat. Nos. 5,393,309; 5,588,973; 5,620,486; 5,916,825; 5,954,843; 5,993,497; and 6,114,542, and British Patent No. 1,486,144, the disclosure of each of which are incorporated herein by reference in their entirety.

Yet another class of detergent additives which may be employed in the present, invention are Mannich reaction products which are typically obtained from the Mannich condensation of a high molecular weight alkyl-substituted hydroxyaromatic compound, an amine containing at least one reactive hydrogen, and an aldehyde. The high molecular weight alkyl-substituted hydroxyaromatic compounds are preferably polyalkylphenols, such as polypropylphenol and polybutylphenol, especially polyisobutylphenol, wherein the polyakyl group has an average molecular weight of about 600 to 3,000. The amine reactant is typically a polyamine, such as alkylene polyamines, especially ethylene or polyethylene polyamines, for example, ethylene diamine, diethylene triamine, triethylene tetramine, and the like. The aldehyde, reactant is generally an aliphatic aldehyde, such as formaldehyde, including paraformaldehyde and formalin, and acetaldehyde. A preferred Mannich reaction product is, obtained by condensing a polyisobutylphenol with formaldehyde and diethylene triamine, wherein the polyisobutyl group has an average molecular weight of about 1,000.

The Mannich reaction products suitable for use in the present invention are described, for example, in U.S. Pat. Nos. 4,231,759 and 5,697,988, the disclosures of each of which are incorporated herein by reference in their entirety.

A still further class of detergent additive suitable for use in the present invention are polyalkylphenoxyaminoalkanes. Preferred polyalkylphenoxyaminoalkanes include those having the formula (II):

wherein $R_5$ is a polyalkyl group having an average molecular weight in the range of about 600 to 5,000, $R_6$ and $R_7$ are independently hydrogen or lower alkyl having 1 to 6 carbon atoms, and A is amino, N-alkyl amino having about 1 to about 20 carbon atoms in the alkyl group N,N-dialkyl amino having about 1 to about 20 carbon atoms in each alkyl group, or a polyamine moiety having about 2 to about 12 amine nitrogen atoms and about 2 to about 40 carbon atoms.

The polyalkylphenoxyaminoalkanes of Formula II above and their preparations, are described in detail, in U.S. Pat. No. 5,669,939, the disclosure of which is incorporated herein by reference in its entirety.

Mixtures of polyalkylphenoxyaminoalkanes ad poly(oxyalkylene) amines are also suitable for use in the present invention. These mixtures are described in detail in U.S. Pat. No. 5,851,242, the disclosure of which is incorporated herein by reference in its entirety.

A preferred class of detergent additive finding use in the present invention are nitro and amino aromatic esters of polyalkylphenoxyalkanols. Preferred nitro and amino aromatic esters of polyalkylphenoxyalkanols include those having the formula wherein $R_8$ is nitro or $-(CH_2)n-NR_{13}R_{14}$, wherein $R_{13}$ and $R_{14}$ are independently hydrogen or lower alkyl having 1 to 6 carbon atoms and n is 0 or 1; $R_9$ is hydrogen, hydroxy, nitro or $-NR_{15}R_{16}$, wherein $R_{15}$ and $R_{16}$ are independently hydrogen or lower alkyl having 1 to 6 carbon atoms; $R_{10}$ and $R_{11}$ are independently hydrogen or lower alkyl having 1 to 6 carbon atoms; and $R_{12}$ is a polyalkyl group having an average molecular weight in the range of about 450 to 5,000.

The aromatic esters of polyalkylphenoxyalkanols shown in Formula III above and their preparations are described in detail in U.S. Pat. No. 5,618,320, the disclosure of which is incorporated herein by reference in its entirety.

Mixtures of nitro and amino aromatic esters of polyalkylphenoxyalkanols and hydrocarbyl-substituted poly(oxyalkylene) amines are also preferably contemplated for use in the present invention. These mixtures are described in detail in U.S. Pat. No. 5,749,929, the disclosure of which is incorporated herein by reference in its entirety.

Preferred hydrocarbyl-substituted poly(oxyalkylene) amines which may be employed as detergent additives in the present invention include those having the formula (IV):

wherein: $R_{17}$ is a hydrocarbyl group having from about 1 to about 30 carbon atoms; $R_{18}$ and $R_{19}$ are each independently hydrogen or lower alkyl having about 1 to about 6 carbon atoms and each $R_{18}$ and $R_{19}$ is independently selected in each —O—$CHR_{18}$—$CHR_{19}$— unit; B is amino, N-alkyl amino having about 1 to about 20 carbon atoms in the alkyl group, N,N-dialkyl amino having about 1 to about 20 carbon atoms in each alkyl group, or a polyamine moiety having about 2 to about 12 amine nitrogen atoms and about 2 to about 40 carbon atoms; and m is an integer from about 5 to about 100.

The hydrocarbyl-substituted poly(oxyalkylene) amines of Formula IV above and their, preparations are described in detail in U.S. Pat. No. 6,217,624, the disclosure of which is incorporated herein by reference in its entirety.

The hydrocarbyl-substituted poly(oxyalkylene) amines; of Formula IV are preferably utilized either by themselves or in combination with other detergent additives, particularly with the polyalkylphenoxyaminoalkanes of Formula III or the nitro and amino aromatic esters of polyalkylphenoxyalkanols shown in Formula III. More preferably, the detergent additives employed in the present invention will be combinations of the hydrocarbyl-substituted poly(oxyalkylene), amines of Formula IV. A particularly preferred hydrocarbyl-substituted poly(oxyalkylene) amine detergent additive is dodecylphenoxy poly(oxybutylene) amine and a particularly preferred combination of detergent additives is the combination of dodecylphenoxy poly(oxybutylene) amine and 4-polyisobutylphenoxyethyl para-aminobenzoate.

Preferred Application Tools and Procedures

Figure 1:
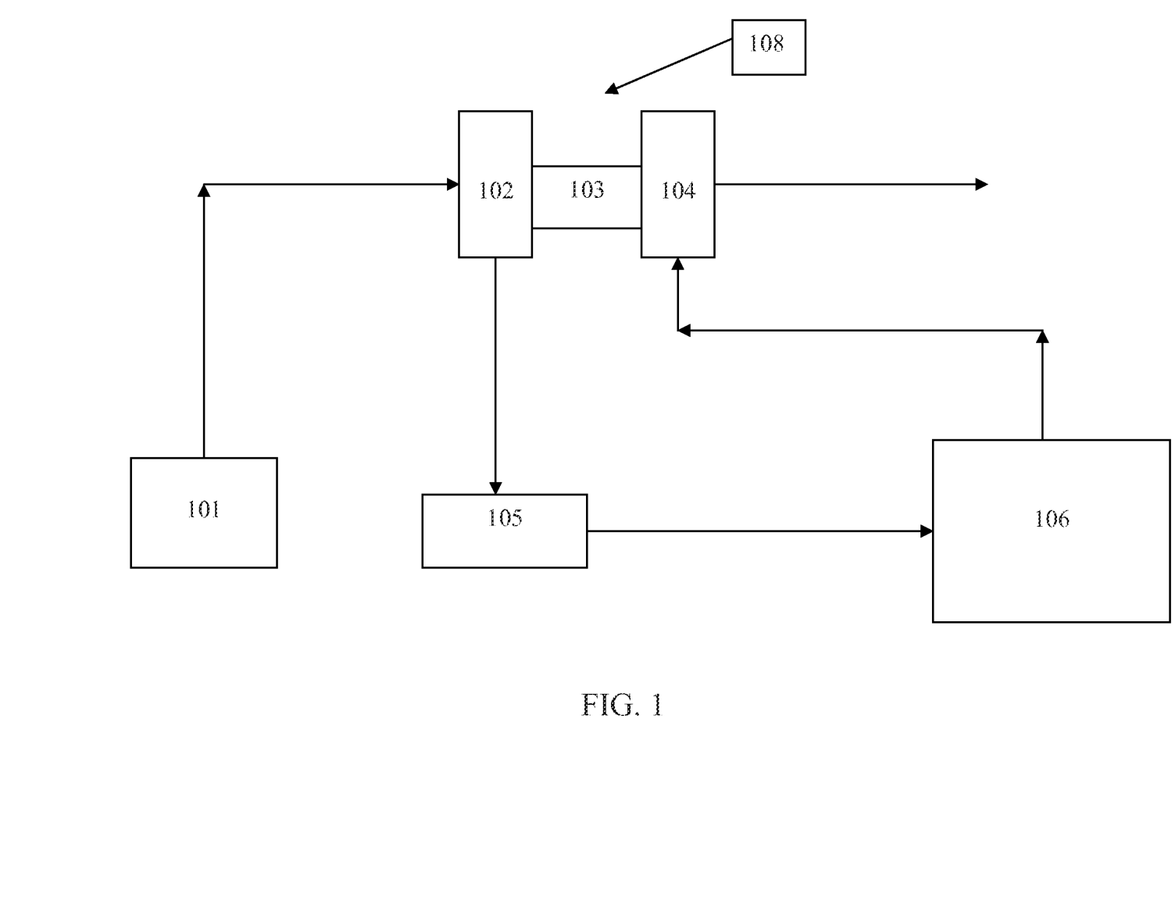
FIG. 1 is a block diagram of a standard engine configuration prior to attachment of the cleaning method of this invention

With reference to the figures, FIG. 1 describes a standard engine configuration with a turbocharger prior to attachment of the cleaning method of this invention. The turbocharger 108 is made up of three sections, a compressor 102, and an exhaust turbine 104 on a shared axle 103. The exhaust from the engine 106 flows through an inlet (not shown) causing the exhaust turbine 104 to rotate. This rotation moves the shared axle 103 which drives the compressor 102, which compresses ambient air received via air filter 101. There is a wastegate (not shown) on the exhaust side that regulates how much of the exhaust pressure is applied to the turbocharger 108 and how much bypasses it, and some of this exhaust pressure is directed out through an outlet on exhaust turbine 104. The outlet air from compressor 102 is usually cooled by an intercooler 105, which uses the engine cooling system to reduce the high temperature of the air before it goes into the intake of engine 106.

Figure 2:
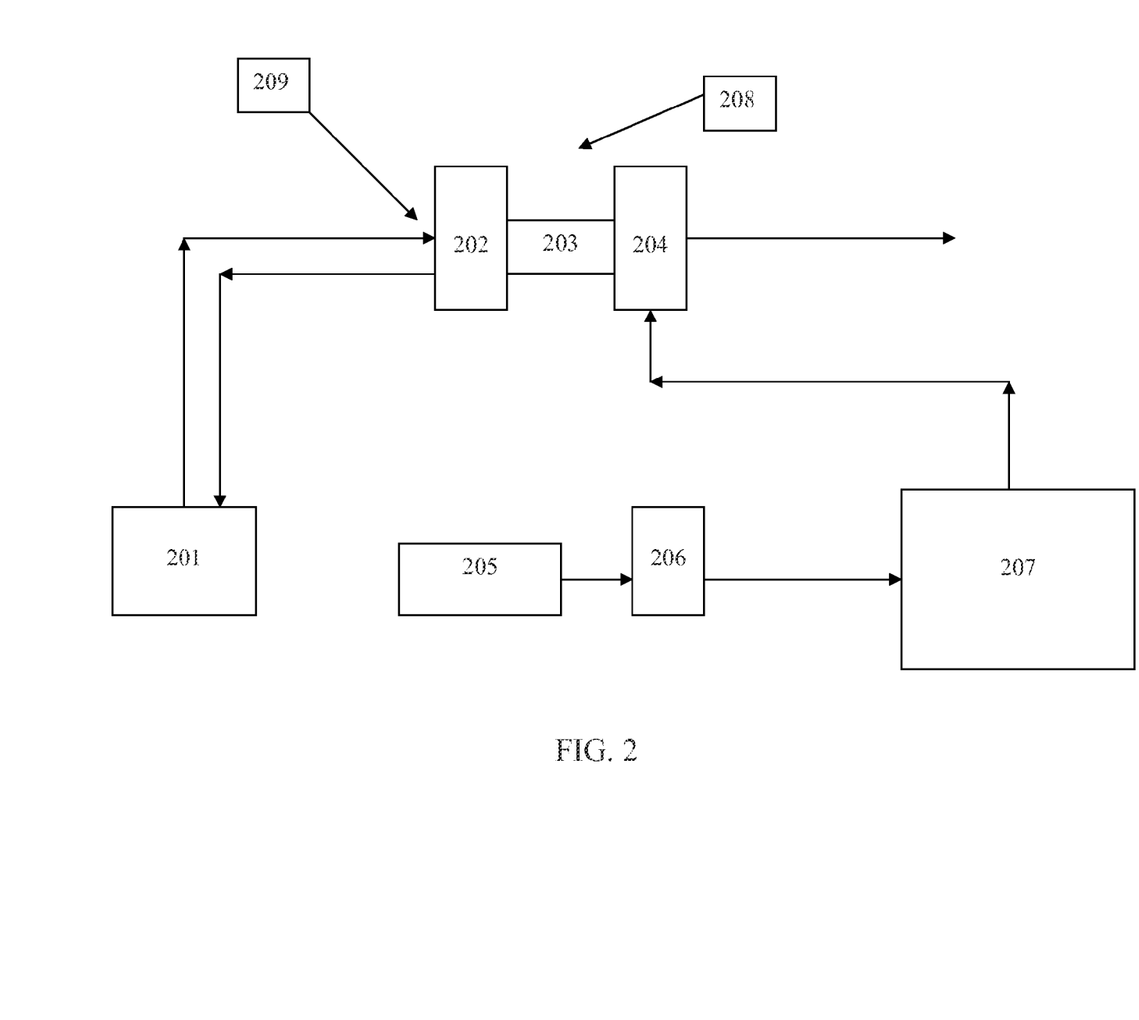
FIG. 2 is a block diagram of an engine configuration during turbocharger cleaning with air recirculation

FIG. 2 describes an engine configuration during turbocharger cleaning with air recirculation. The turbocharger 208 is made up of three sections, a compressor 202, and an exhaust turbine 204 on a shared axle 203. In FIG. 2, the high pressure side of the compressor 202 is disconnected from the intercooler 206, or air intake manifold for non-intercooled engines, while leaving said compressor 202 attached to a typical means (exhaust) used in the engine to drive compressor 202, and recirculated to the low pressure side to a means for separating a cleaning fluid from air, a non-limiting example of such means is the fluid separation drum 201. All the while, engine 207 is turned off. Preferably, the engine 207 is a compression ignition engine, and the compressor 202 is a turbocharger or supercharger compressor, and more preferably, a turbocharger compressor. The compressor 202 is disconnected from the intercooler 206 to prevent cleaning fluid-containing, intake air from entering the engine 207. This output airflow from compressor 202 can be directed to the fluid separation drum 201 or to a suitable disposal (not shown), non-limiting examples of which include a drain, container, or receptacle. The compressor 202 is powered by the exhaust from the engine 207, which flows through an inlet (not shown) causing the exhaust turbine 204 to rotate. This rotation moves the shared axle 203 which drives the compressor 202. The intake air for operating the engine is not passing the compressor, but instead, taken from the atmosphere, and optionally through air filter 205 and intercooler 206. Also, it is not essential for the air return from the fluid separation drum 201 to be connected to the turbocharger, although this would be preferable.

After starting the engine, a major amount of fresh cleaning fluid 209 is injected into, the air stream in the low pressure side of the turbocharger compressor 202. The cleaning fluid 209 is introduced into the compressor through any suitable means, and non-limiting examples include: spraying the cleaning fluid via a common furnace burner injector, and pressurized sources such as aerosols and pumps. It is important, however, that the cleaning fluid introduction means result in a cleaning solution droplet size sufficiently small such that the cleaning fluid is carried essentially quantitatively by the air stream to the turbocharger. Cleaning fluid 209 having passed through the turbocharger compressor 202, having solved and dispersed dirty or used cleaning fluid, will separate/drop out of the air stream due to a lower air velocity in the fluid separation drum 201. An additional air vent (not shown), on top of the fluid separation drum 201 will prevent any, pressure or vacuum from building up inside the drum 201. Used cleaning fluid can be drained from the fluid separation drum after the clean up method and should be disposed of according local environmental rules.

Figure 3:
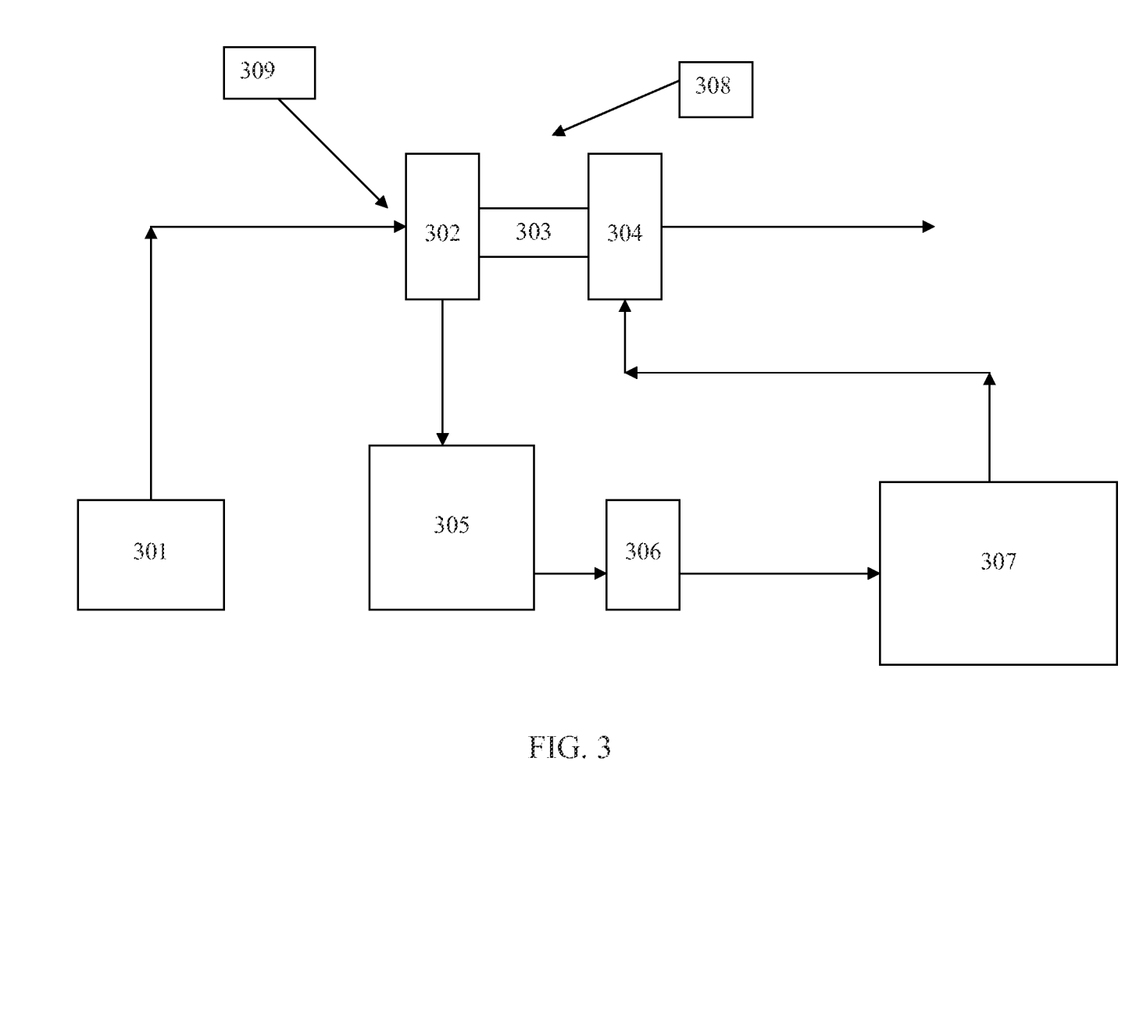
FIG. 3 is a block diagram of an engine configuration during turbocharger cleaning without air recirculation

In FIG. 3, an alternative method, is shown to separate the cleaning fluid from the intake air in situations where air recirculation is problematic. The turbocharger 308 is made up of three sections, a compressor 302, and an exhaust turbine 304 on a shared axle 303. In these situations where air recirculation is problematic, a means for separating cleaning fluid from air (a non-limiting, example of which is the fluid separation drum 305) can be used without air recirculation. A conduit (not shown) is attached to the high pressure downstream side of the compressor 302, and the compressor 302 is disconnected from the intercooler 306, or air intake-manifold for non-intercooled engines, all while the engine 307 is turned off. Attached to the fluid separation drum 305 are inputs to (not-shown) and outputs from (not shown) in the fluid separation drum 305. The output-airflow from compressors 302 can be directed the fluid separation drum 305. The fluid separation drum 305 is positioned in between the turbocharger compressor 302 and the intercooler 306, or even bypassing the intercooler 306, directing the remainder of intake air directly from the fluid separation drum, 305 to an air inlet manifold (not shown) of engine 307. This cleaning fluid can be drained after cleaning to prevent cleaning fluid from accumulating in the engine. An air restriction valve (not shown) can be placed in the air inlet system for additional safety to prevent engine runaway.

Preferably, the engine 307 is a compression ignition engine, and the compressor 302 is a turbocharger or supercharger compressor, and more preferably, a turbocharger compressor. The compressor 302 is powered by the exhaust from the engine 307, which flows through an inlet (not shown) causing the exhaust turbine 304 to rotate. This rotation moves the shared axle 303 which drives the compressor 302. The intake air for operating the engine 307 is not passing the compressor 302, but instead, taken from the atmosphere via air filter 301.

After starting the engine, a major amount of fresh cleaning fluid 309 is injected into the air stream in the low pressure side of the turbocharger compressor 302. The cleaning fluid 309 is introduced into the compressor through any suitable means and non-limiting examples include: spraying the cleaning fluid via a common furnace burner injector, and pressurized sources such as aerosols and pumps.

EXAMPLES

Effect of Cleaning Fluid

An investigation was made into the effect of different cleaning fluids in cleaning field-dirtied turbocharger compressors. The dirty compressors were opened, and a droplet of cleaning fluid was placed on the dirty compressor surface, and the surface was slowly rubbed with a tissue.

Two different classes off cleaning fluids were tested. These classes were oxygenated cleaning fluids similar to the cleaning fluids employed in U.S. Pat. No. 6,652,667 and U.S. Pat. No. 6,616,776, which are composed primarily of oxygenated solvents such as 2-phenoxyethanol, 2-butoxyethanol and propylene carbonate, and also aromatic cleaning fluids based primarily on aromatic solvents, both with and without a common polyalkylene succinimide diesel deposit control additive.

It was found that although oxygenated cleaning fluids were not effective in cleaning turbocharger deposits using the procedure described above, aromatic cleaning fluids with or without deposit control additive were effective in removing the typical turbocharger deposits.

Test Procedure

A major advantage of this invention is that it may be implemented with parts commonly found in service garages. The invention was demonstrated in practice using the equipment described as follows. A dirty Borg-Warner Type K29 turbocharger was mounted onto a AN D2066LF11 Euro: IV engine. The conduit from the air filter to the input of the compressor and the conduit from the output of the compressor to the intercooler were both disconnected at the turbocharger compressor housing.

55-gallon drum was used as a cleaning fluid separation device. Standard fittings for the drum bungs were used to connect conduits to the air input and output of the turbocharger compressor housing, with the connections to the housing made with rubber hose and ring clamps. This achieved a closed system.

A commercially available pressurized brake fluid changer equipped with pressure and flow regulators was used to provide cleaning fluid to the compressor to be cleaned. A common furnace burner injector was, used to spray cleaning fluid into the input side of the compressor air inlet. The injector was sealed into the compressor air inlet by removing a sensor, inserting the injector into the sensor housing, and then sealing with elastic hose and ring clamps.

The engine was started, and a cleaning fluid composed of aromatic solvent with a flash point of 150° F. containing a minor amount of polyalkylene succinimide was fed to the input side of the compressor at 5 liters 30 minutes. Cleaning fluid was sprayed into the compressor for 30 minutes, and then cleaning fluid addition was discontinued. The engine was run for an additional 5 minutes to further remove cleaning fluid from the compressor.

The engine was stopped, the cleaning system connections removed, and the turbocharger removed from the engine. Upon disassembly of the turbocharger compressor it was discovered that deposits had been essentially entirely removed from the turbocharger compressor, including both the compressor vanes and the housing.

That which is claimed:

1. A method for removing deposits from at least one compressor powered and used by a compression ignition engine, comprising (a) disconnecting, while said engine is turned off, a high pressure downstream side outlet of said compressor from an intercooler of the engine, or an air intake manifold for non-intercooled engines, while leaving said compressor attached to the engine to drive the compressor, (b) diverting the output airflow from said compressor away from the engine to a receptacle for separating a cleaning fluid from air, (c) starting said engine, (d) introducing an injector to inject said cleaning fluid into an air stream in a low pressure side upstream of said compressor; and (e) while said engine is running, injecting said cleaning fluid via the injector in step (d) for a sufficient time to clean said compressor.

2. The method of claim 1 wherein said cleaning fluid comprises (i) a major amount of an aromatic hydrocarbon solvent.

3. The method of claim 2, wherein said cleaning fluid further comprises (i) at least one nitrogen containing detergent additive.

4. The method of claim 2 wherein said aromatic hydrocarbon, solvent comprises a $C_9$ aromatic solvent.

5. The method of claim 2 wherein said aromatic-hydrocarbon solvent comprises at least 80 volume percent aromatics.

6. The method of claim 2 wherein said aromatic hydrocarbon solvent comprises at least 90 volume percent aromatics.

7. The method of claim 1 wherein said receptacle for separating said cleaning fluid from air in step (b) is a fluid separation drum.

8. The method of claim 3 wherein said at least one nitrogen containing detergent additive comprises a hydrocarbyl-substituted succinimide.

9. The method of claim 1 wherein said compressor is a turbocharger compressor.

10. The method of claim 1 wherein said compressor is a supercharger compressor.

11. A method for removing deposits from at least one compressor powered and used by a compression ignition engine, comprising (a) disconnecting, while said engine is turned off, a high pressure downstream side outlet of said compressor from an intercooler for the engine, or an air intake manifold for non-intercooled engines, while leaving said compressor attached to the engine to drive the compressor, (b) attaching a conduit to the high pressure downstream side outlet of said compressor, (c) attaching, an input to and output from, a receptacle for separating a cleaning fluid from air, (d) diverting the output airflow from said compressor to said receptacle for separating said cleaning fluid from air, and further directing the remainder of said airflow to said engine, (e) starting said engine (f) introducing an injector to inject said cleaning fluid into an air stream in a low pressure side upstream of said compressor; and (g) while said engine is running, injecting said cleaning fluid via the injector in step (f), for a sufficient time to clean said compressor.

12. The method of claim 11, wherein said cleaning fluid comprises (i) a major amount of an aromatic hydrocarbon solvent.

13. The method of claim 12, wherein said cleaning fluid further comprises (i) at least one nitrogen containing detergent additive.

14. The method of claim 12 wherein said aromatic hydrocarbon solvent comprises a $C_9$ aromatic solvent.

15. The method of claim 12 wherein said aromatic hydrocarbon solvent comprises at least 80 volume percent aromatics.

16. The method of claim 12 wherein said aromatic hydrocarbon solvent comprises at least 9.0 volume percent aromatics.

17. The method of claim 11 wherein said receptacle for separating said cleaning fluid from air in step (c) is a fluid separation drum.

18. The method of claim 13 wherein said at least one nitrogen containing detergent additive comprises a hydrocarbyl-substituted succinimide.

19. The method of claim 11 wherein said compressor is a turbocharger compressor.

20. The method of claim 11 wherein said compressor is a supercharger compressor.

* * * * *